US005734964A

United States Patent [19]

Fishman et al.

[11] Patent Number: 5,734,964

[45] Date of Patent: Mar. 31, 1998

[54] MASS PROGRAMMABLE FM STEREO SOUND EQUALIZED ASSISTIVE LISTENING APPARATUS

[75] Inventors: Duke G. Fishman, Fremont; Ronald C. Hensley, San Jose, both of Calif.

[73] Assignee: Chaparral Communications, San Jose, Calif.

[21] Appl. No.: 792,056

[22] Filed: Feb. 3, 1997

Related U.S. Application Data

[63] Continuation of Ser. No. 130,368, Oct. 1, 1993, abandoned.

[51] Int. Cl.$^6$ ..... H04B 7/00

[52] U.S. Cl. ..... 455/42; 455/186.1

[58] Field of Search ..... 455/68, 66, 70–71, 455/62, 343, 186.1, 186.2, 41–42, 89, 268, 103, 110, 113; 381/77–82, 25, 68.2, 68.4, 68.6, 68, 69.2; 340/825.44

[56] References Cited

U.S. PATENT DOCUMENTS

| | | | |
|---|---|---|---|
| Re. 25,652 | 10/1964 | Kennedy . | |
| 3,906,160 | 9/1975 | Nakamura et al. . | |
| 4,165,487 | 8/1979 | Corcerman | 455/41 |
| 4,330,867 | 5/1982 | Fujita | 455/186 |
| 4,352,206 | 9/1982 | Aschwanden | 455/184 |
| 4,476,582 | 10/1984 | Strauss et al. | 455/166 |
| 4,491,980 | 1/1985 | Ichikawa | 455/344 |
| 4,503,525 | 3/1985 | Malik et al. . | |
| 4,539,708 | 9/1985 | Norris | 455/49 |
| 4,618,997 | 10/1986 | Imazeki et al. | 455/186.1 |
| 4,771,399 | 9/1988 | Snowden et al. | 364/900 |
| 4,790,019 | 12/1988 | Heuber | 381/68.4 |
| 4,843,588 | 6/1989 | Flynn | 364/600 |
| 5,034,819 | 7/1991 | Tsukagoshi | 358/191.1 |
| 5,073,767 | 12/1991 | Holmes et al. | 340/825.44 |
| 5,086,513 | 2/1992 | Lawrence et al. | 45/186 |
| 5,152,003 | 9/1992 | Poch | 455/186.1 |
| 5,161,250 | 11/1992 | Ianna | 455/344 |
| 5,191,277 | 3/1993 | Ishikura et al. | 455/89 |

FOREIGN PATENT DOCUMENTS

| | | | |
|---|---|---|---|
| 2011738 | 7/1982 | WIPO | 381/68 |

OTHER PUBLICATIONS dB50™ Personal Listening System, Jan. 1992.

*Primary Examiner*—Nguyen Vo
*Attorney, Agent, or Firm*—William E. Pelton, Esq.

[57] ABSTRACT

A mass programmable FM assistive listening system preferably consists of an FM transmitter adapted to send audio signals on a selected one of a plurality of predetermined available channels. The system includes a plurality of portable receivers which may be mass programmed to receive a selected one of said predetermined channels from a membrane style keypad. The audio signal is preferably stereo, sound equalized and within the frequency range of from about 72 to about 76 megahertz.

3 Claims, 5 Drawing Sheets

MASS PROGRAMMABLE FM STEREO SOUND EQUALIZED ASSISTIVE LISTENING APPARATUS

This is a continuation of application Ser. No. 08/130,368, filed Oct. 1, 1993, now abandoned.

BACKGROUND OF THE INVENTION (1.) Field of the Invention

The present invention relates to mass programmable FM stereo sound equalized assistive listening systems and, more particularly, to assistive listening devices (ALD) for the hearing impaired.

(2.) Description of the Related Art

Conventional assistive listening devices include infrared transmitters, magnetic loop systems, monaural narrow band and wide band stereo FM systems. Such systems are usually limited in their ability to address the particular needs of the hearing impaired. For example, most hearing impaired persons have difficulty hearing sound at the high frequency end of the spectrum. The commonplace assistive listening devices simply provide amplification of the sound and do not boost the high frequency audio relative to the low frequency audio to compensate for the high frequency loss of the listener.

Infrared systems use an invisible light to transmit information to a plurality of receivers. Each receiver usually contains a receiving unit that sits on top of the head and has earphones that plug into the ear. The weight of such a receiver becomes uncomfortable after a time. Infrared systems are also costly because the transmitter is relatively expensive and installation is labor intensive. Such systems, moreover, do not lend themselves to being moved easily from facility to facility. They are generally monaural and their effectiveness and range is limited by ambient lighting conditions in the environment. Power is supplied from throw away batteries, which must be replaced after use.

Magnetic loop systems are installed around the area to be covered and usage must be within the confines of the loop thereby limiting the range of travel of the user. They are believed to have somewhat poorer audio quality since they transmit signals to a person's hearing aid "T" coil pick up. These systems are also costly to set up and have been found to have limited flexibility in moving the loop from one room to another.

FM systems for the hearing impaired require a transmitter and a receiver operating in the frequency range from 72–76 mHz. Most such systems operate at a fixed frequency with the frequency set at the factory to the channel of use. FM systems with fixed or limited channels are not well suited for, and may present a problem in, large facilities with several simultaneous programs occurring close to each other, such as multi-screen theaters or classroom buildings. Moreover, FM assistive listening systems for the hearing impaired have not heretofore provided a sufficient number of channels to meet the demand.

Some FM systems for the hearing impaired have switch selectable channels. For example, the dB50 ALD system by Chaparral Communications has a frequency presettable FM stereo transmitter with ten channels and a plurality of receivers wherein tuning is performed manually using a control knob on the side of the unit. This system has performed well, especially for home use. However, should its tuning knob be inadvertently disturbed, mistuning and a distorted signal can result. This possibility, and the consequent need for retuning is thought to be somewhat disadvantageous in a theater setting and, under some circumstances, it has been necessary for users to obtain the assistance of the provider for retuning the receiver.

The receivers in the db50 system use rechargeable batteries. However, each receiver must be separately charged through a plug on the side of the receiver connected to a wall power outlet. Accordingly, the number of receivers that may be maintained is potentially limited by the number of available wall outlets.

SUMMARY OF THE INVENTION

The present invention constitutes a substantial improvement in mass programmable FM stereo listening devices and, in particular, an improvement in assistive listening devices for the hearing impaired which operate in the frequency range of from 72 to 76 megahertz.

It is therefore an object of the present invention is to provide an FM listening system which is easy to install and easy to move as required.

Another object of the present invention is to provide such a system which is not limited by ambient light conditions and has good audio quality.

It is a further object of the present invention to provide such a system in which a plurality of units using rechargeable batteries may be simultaneously recharged from a single stand.

Yet another object of the present invention is to provide a listening system in which the receivers utilize light weight earphones which are separately replaceable, comfortable to wear, and inexpensive to replace.

Still another object of the present invention is to provide a listening system in which tone controls are provided on the receiver to adjust the high frequency audio as required by a hearing impaired listener.

It is yet a further object of the present invention to provide a listening system with high quality stereo sound and in which the audio frequency response is adjustable by the user.

It is also an object of the present invention to provide a listening system having receivers that can be set on any one of a plurality of channels without a tuning knob, and in which the set channel is retained even after the receiver is turned off.

It is still a further object of the present invention to provide a listening system having security features adapted to prevent a user from changing the prescribed channel to another channel so as to listen to a nearby but different program.

It is yet another object of the present invention to provide a listening system having a minimum number of controls, i.e. left and right tone boost, volume and power switch.

It is still another object of the present invention to provide a listening system with the ability to charge large quantities of receivers at a time and to quickly set and reset the receiver to any one of a plurality of transmitter frequencies.

It is a still further object of the present invention to provide a listening system which is easy to use and may be operated by personnel having only a minimal amount of training.

According to the present invention, a mass programmable FM stereo sound equalized assistive listening device comprises an FM stereo transmitter transmitting audio signals on either all or a selected one of a plurality of selectable preset channels, a plurality of receivers which can be programmed to receive any one of said plurality of selectable preset channels and provide the audio transmitted on said selected frequency to a listener with the high frequency boosted with respect to the low frequency, and a programmer/charger which 1) programs said plurality of receivers to said selected one of said plurality of selectable preset channels when a selection is made on a membrane style keypad, and 2) charges said plurality of receivers whenever they are connected to said programmer/charger.

BRIEF DESCRIPTION OF THE DRAWINGS

A further understanding of the present invention may be had in connection with the accompanying drawings, in which.

DETAILED DESCRIPTION OF THE INVENTION

A preferred embodiment of the invention will now be described with respect to FIGS. 1–5 of the drawings.

Figure 4:
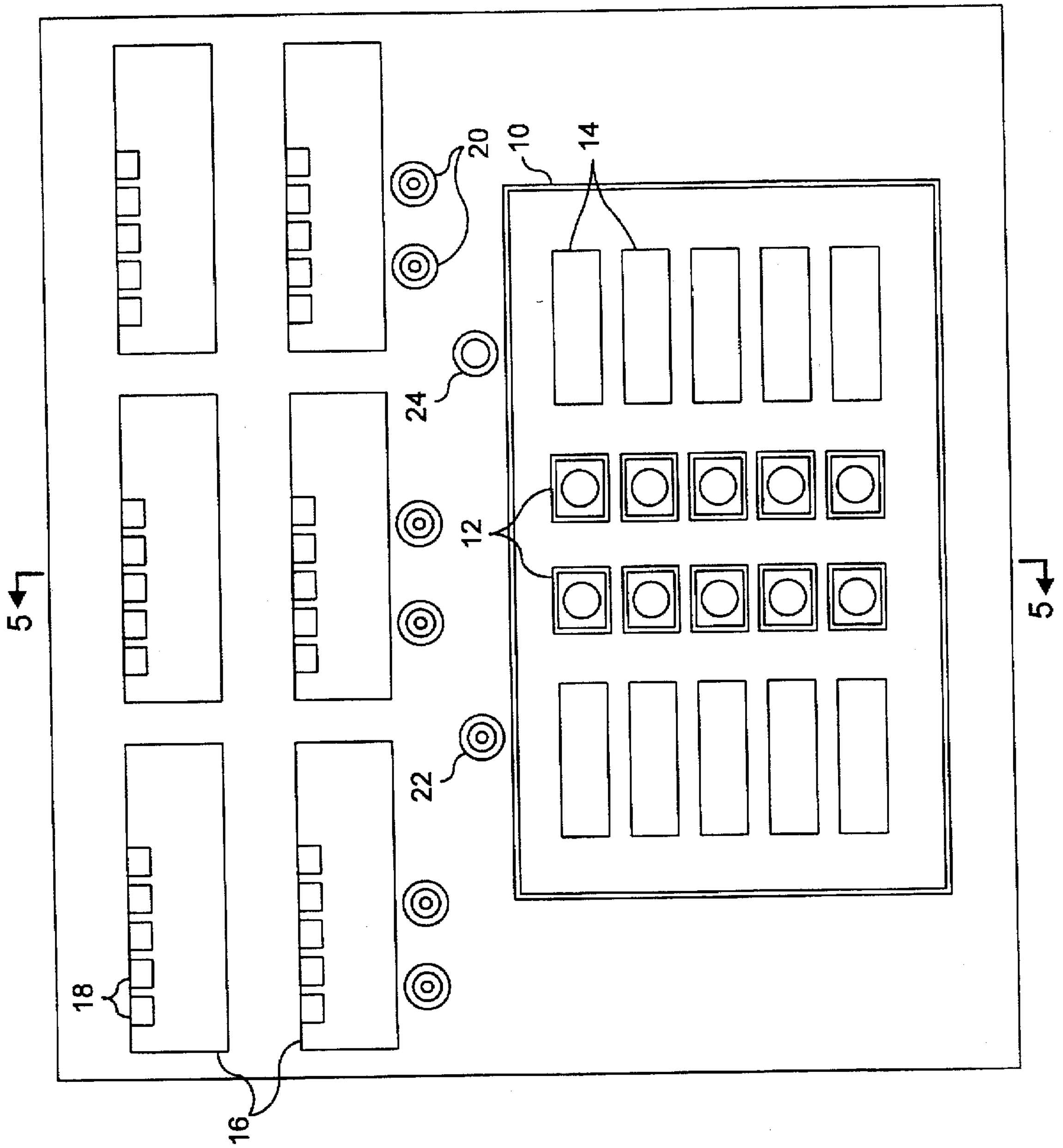
FIG. 4 is a perspective top view of the Programmer/Charger.
Figure 5:
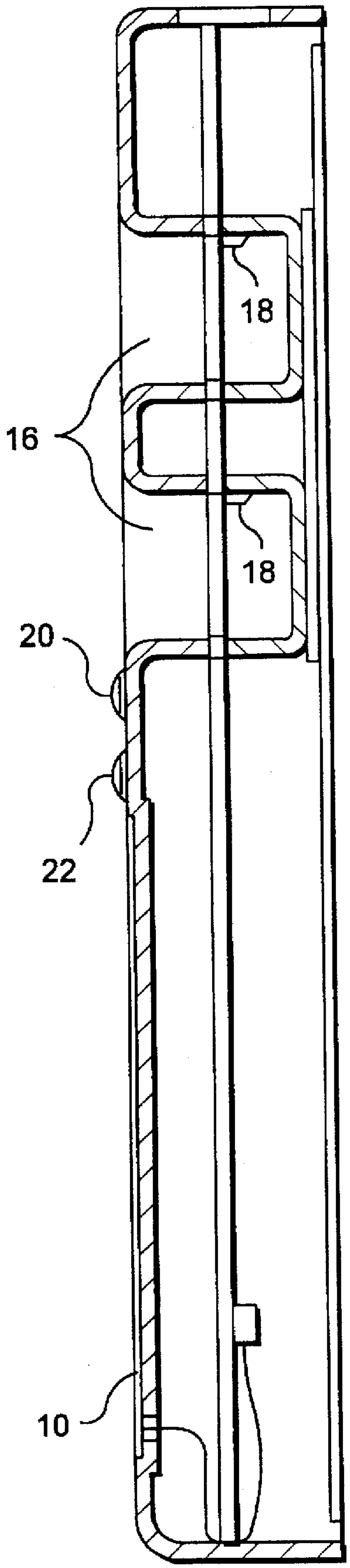
FIG. 5 is a side view of the Programmer/Charger taken along line A—A of FIG. 4.

FIGS. 4 and 5 show a preferred embodiment of the programmer/charger of the invention. There is a channel selection panel 10 having a plurality of membrane style pads 12 and a plurality of label areas 14 next to the pads on the face of the programmer/charger. The number of pads and label areas is the same as the number of different selectable preset channels transmitted by the transmitter. In the preferred embodiment there are ten selectable preset channels and ten membrane style pads.

The programmer/charger also contains a plurality of recessed receiver pockets 16, each having a plurality of contacts 18 which engage corresponding elements located at the back of a receiver inserted into the pocket. Each receiver pocket has associated therewith one of a plurality of lights 20 indicating a charging status of a receiver in the receiver pocket. The programmer/charger also has a light 22 for indicating the programming status thereof and a connection 24 to permit testing.

Programming is accomplished by inserting the receiver(s) into the programmer/charger and simply pressing one of the membrane style pads 12 of selection panel 10. Channel identification data is input to the receiver's control circuit through one of the contacts 18 in each of the receiver pockets. Other contacts 18 in each receiver pocket supply enable, clock, and voltage inputs for recharging the receivers. Programming takes less than one second and once programmed, the receiver may be removed from the programmer/charger and taken to the appropriate area for use.

Figure 2:
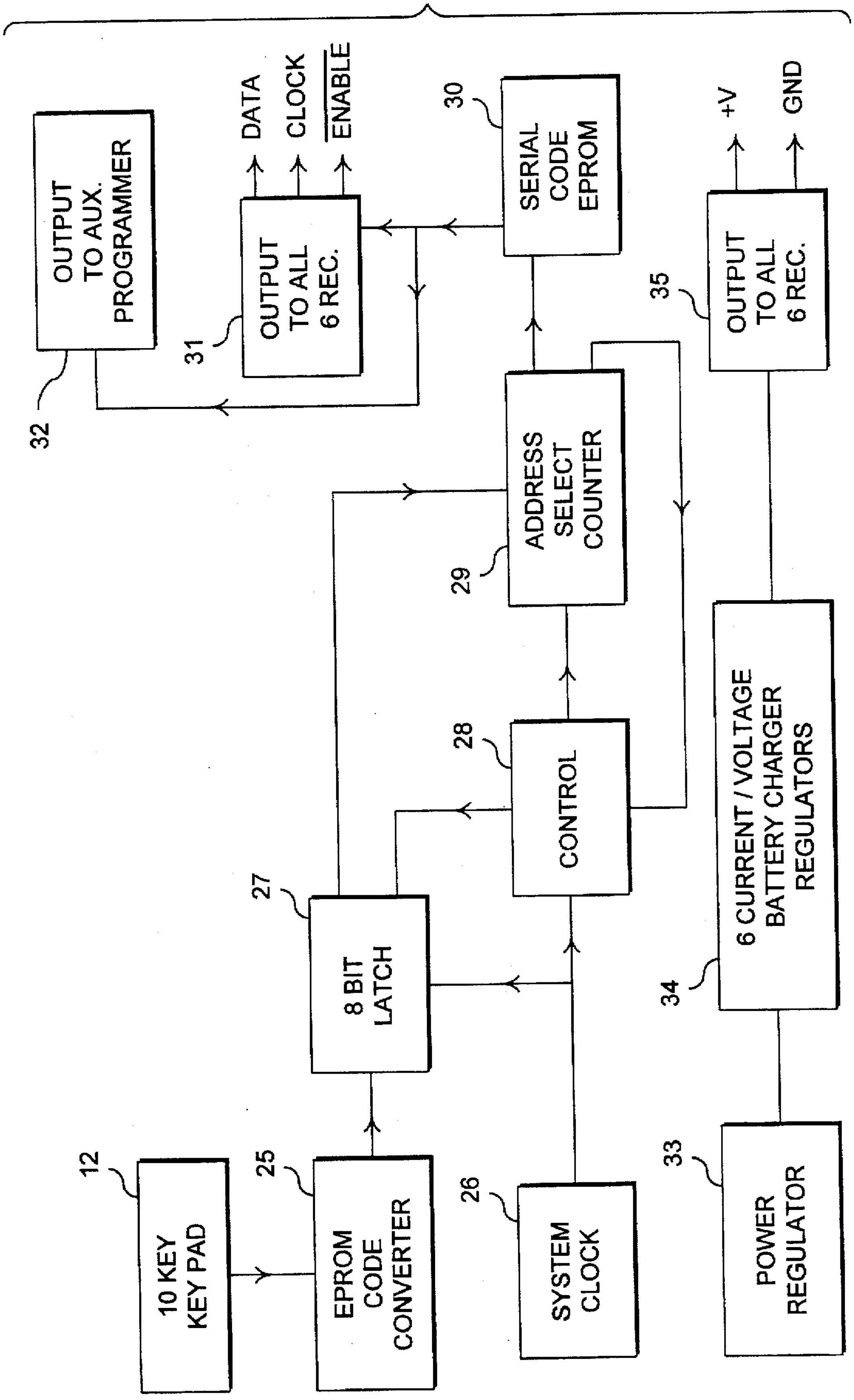
FIG. 2 is a block diagram showing the main components of a Programmer/Charger according to one embodiment of the invention.

The structure of the programmer/charger will be described next with reference to FIG. 2 of the drawings. In the present embodiment, the programmer/charger is a digital state machine, without an embedded microprocessor. A combination of digital clocks, counters, memory and gates are used to generate the coded serial data stream used by the receivers PLL. When one of the membrane style pads 12 is pressed corresponding to a facility where the receiver is to be used or a program to be listened to as described later, an 8-bit code is generated by an electrically programmable read only memory (EPROM) code converter 25 designating the selected channel which is then latched into latch 27. The latch operates in response to system clock 26 and control circuit 28. The output of latch 27 goes to address select counter 29. This counter is a multi-bit counter which counts system clocks and provides output bits which are used to address serial code EPROM 30. An example of a suitable address select a counter 29, is disclosed in U.S. Pat. No. 4,503,525 to Malik et al., the disclosure of which is hereby incorporated by reference. At the end of the digital words, one bit is sensed on the last nibble and is sent to control circuit 28 to reset latch 27. Once latch 27 is reset the system clock no longer drives counter 29. The programmer/charger is then in standby mode until another one of pads 12 is pressed.

EPROM 30 holds data containing a plurality of predetermined codes which, when sent to the receivers, will respectively identify one of the channels. This data is sequentially accessed by counter 29 so that a serial data word containing data, clock and enable pulses is output to output circuit 31. Circuit 31 buffers the output from the EPROM and then relays the data, clock and enable signals to the receivers on separate lines to selected contacts 18 in each receiver pocket 16 on the programmer/charger.

The output of EPROM 30 is also received by output circuit 32. Circuit 32 similarly relays the signals to an auxiliary programmer/charger and buffers them to prevent any loading of the system in a fault condition. A connector is provided on the rear of the programmer/charger (not shown) to connect the auxiliary programmer.

This programming circuit is uniquely advantageous. It permits each of any number of receivers to be programmed to any one of a plurality of channels all at one time. Receivers can be removed from the programmer/charger for a particular activity and any of the remaining receivers may be reprogrammed to another respective channel. Furthermore, the preferred embodiment of the programmer/charger utilizes a digital state machine to accomplish programming rather than a microprocessor. The system may therefore be relatively low in cost and uncomplicated. The receiver(s) can also be programmed an unlimited number of times without degrading performance. Also, since programming is not accomplished by inserting data into the audio signal, it can be done with the receiver(s) turned off and channel information can be retained within the receiver's control circuits, even when the receiver(s) are off.

Charging of the receiver(s) batteries is also carried out by the programmer/charger whenever the receivers are connected. A transformer is used to obtain power from a 110V wall outlet. A power regulator 33 inside the programmer/charger is connected to six current/voltage battery charger regulators 34 that will charge up to six receivers at a time. When the receiver(s) are in pockets 16, current is applied to the batteries of the receivers at contacts 18 through output circuitry 35. One output is shared ground and another is for the charging current. Each of the charger regulators 34 uses a respective current limiting resistor to provide power to a respective transistor. An internally adjustable reference is used to set the charge slope and trickle levels. Initial current is limited to 100 mA and then decreases to 15 mA near full charge. The batteries will reach 70% charge in about 3 hr. and full charge in about 8–10 hrs.

A connector is also provided (not shown) to connect a slave charger (holding twelve receivers in a preferred embodiment) to the main programmer/charger. In the present embodiment, there are two connectors on the back of each auxiliary charger. One is an input from the main programmer/charger and the other is output to the next auxiliary charger. Any number of auxiliary chargers can be strung together in a daisy chain with the main programmer/charger. The output connector of the programmer/charger also carries a sense wire (not shown) that turns on the auxiliary charger when power is applied to the main programmer/charger. The ability to charge and program any one or a number of receivers together is very versatile and constitutes a unique advantage of the preferred embodiment of the invention.

Figure 1:
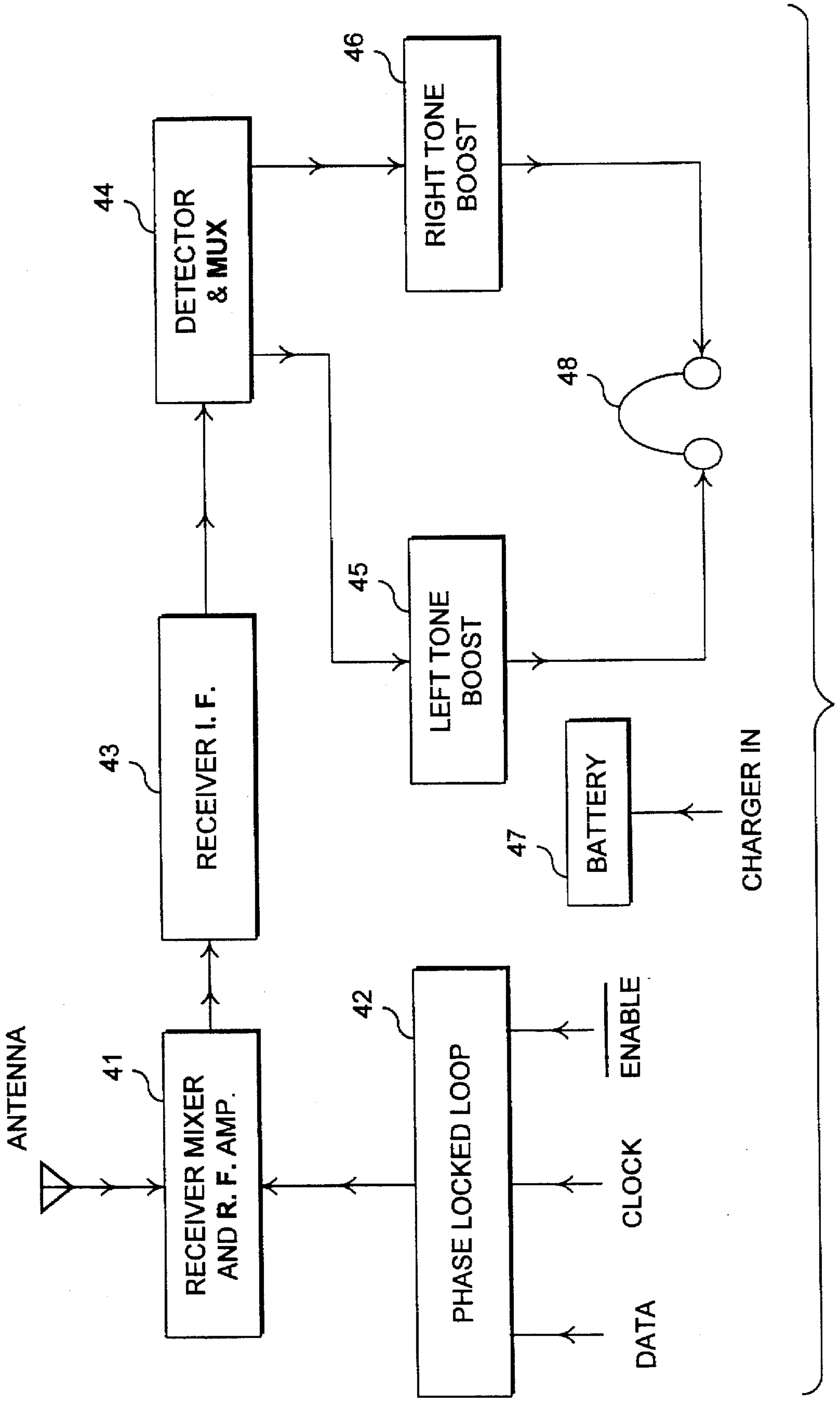
FIG. 1 is a block diagram of the main components of a FM stereo receiver according to one embodiment of the invention.

A preferred embodiment of a receiver is shown in FIG. 1 of the drawings. It has a frequency stabilized circuit using a digitally controlled Phase Locked Loop (PLL) local oscillator 42 that is programmed to a selected one of a plurality of channels by the signals output by output circuits 31 and/or 32 of the programmer/charger in FIG. 2. PLL oscillator 42 tunes the receiver to the appropriate channel using receiver mixer and rf amplifier 41 in accordance with the received data, clock, and enable signals. Once programmed the receiver will remain on the programmed channel so long as rechargeable battery 47 has a charge or until the receiver is reprogrammed to another channel. This simplifies the operation for the users and prevents inadvertent changing of the receiver's channel, thus providing some level of security for other nearby activities. If however the battery is permitted to discharge the channel programming is lost, rendering the receiver useless.

The audio signal received on the programmed channel is processed by Receiver IF 43 and Detector and MUX 44. Controls are provided on the receiver to adjust left and right tone boost in circuits 45 and 46 for output to earphones 48. The left and right tone boost provides high frequency (1 to 4 kHz) boost of up to 30 dB for the hearing impaired. The receiver also contains volume control and power switches. The power switch on the receiver may be turned on or off as needed without losing the channel programming.

Figure 3:
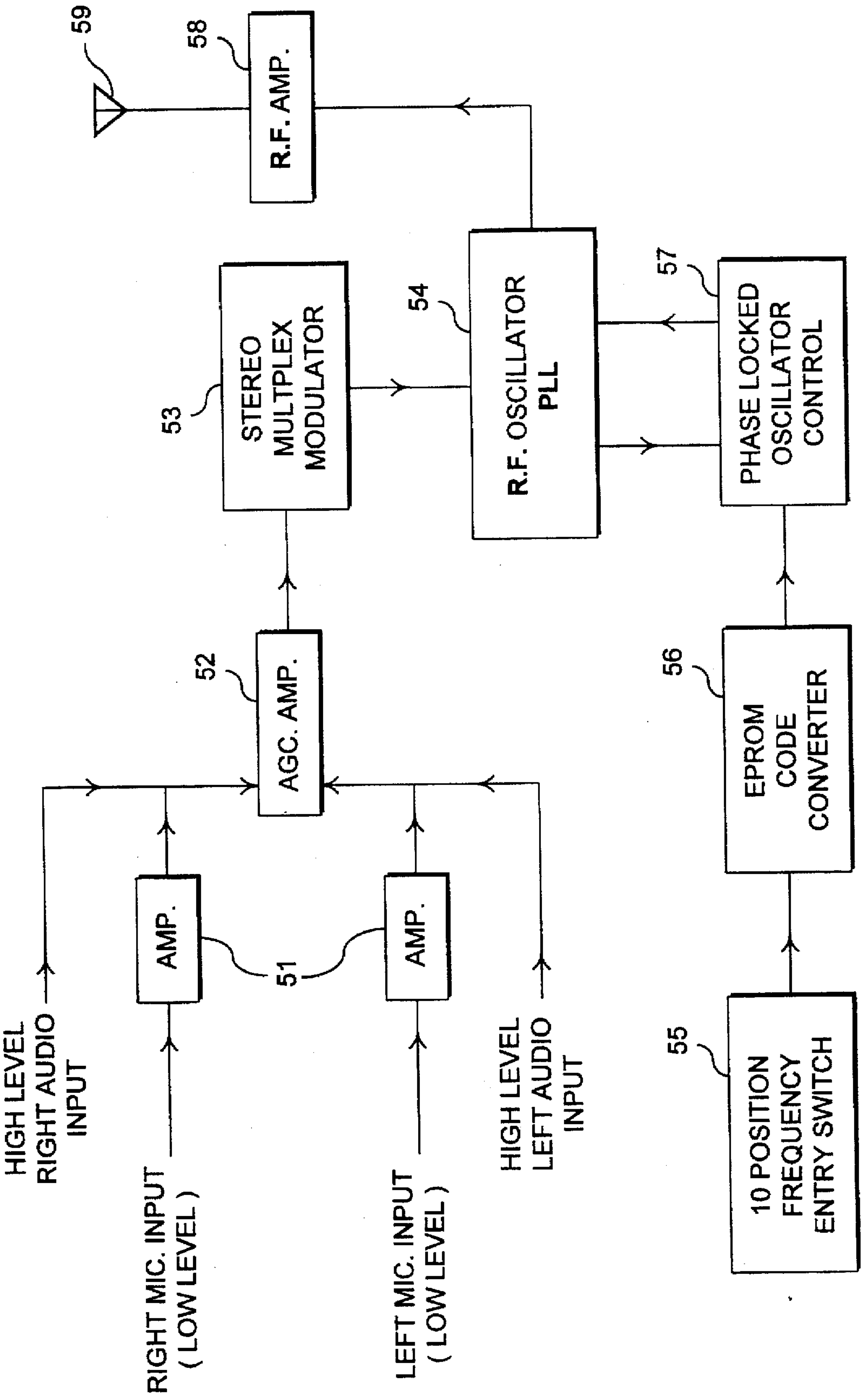
FIG. 3 is a block diagram showing the main components of a Stereo Transmitter according to one embodiment of the invention.

A preferred embodiment of the transmitter is shown in FIG. 3 of the drawings. Such a transmitter is capable of transmitting one of ten different channels manually selected by a recessed ten position frequency entry switch 55 on the back panel of the unit. EPROM code converter 56 is employed as a code converter for the channel spacings and code converts the switch input to channel programming information for phase locked oscillator control 57. Control 57 controls the modulator oscillator in PLL 54, locking it onto the frequency for the selected channel. Power amplifier 58 then buffers and amplifies the signal to be transmitted by extendable antenna 59. A connectable transformer allows the transmitter to receive power from a 110 v wall outlet. If no audio is presented to the transmitter for 10 minutes, the transmitter will turn itself off, but will turn on again when audio is received.

The transmitter is a full FM stereo unit that contains audio processing that modulates the channel transmitter with a PLL controlled oscillator 54. Two types of audio inputs are provided. One input mechanism consists of two RCA-type connectors for LEFT and RIGHT audio channels with an input range of 0.1 to 2 VRMS and an input resistance of 4000 Ohms. The other is a mini stereo phone connector with LEFT and RIGHT audio input channels having a sensitivity of 0.01 to 0.2 VRMS into 2000 Ohms. An automatic level control (ALC) 52 is provided. ALC 52 controls the level of the audio to stereo multiplex circuit 53. This ensures that the modulation reaching the modulator is not over driven by load sounds. ALC 52 has a fast attack time and a slow release, this keeps the deviation set to 80 kHz peak-peak.

This circuit allows a number of different audio sources to be input into the transmitter. For example, the transmitter may be connected to a sound processor system such as that used in a theater for DOLBY ("DOLBY" is a registered trademark of Dolby Labs, Inc.) stereo. This allows the ALD to make DOLBY stereo available to the hearing impaired. In the example of a DOLBY stereo system, the inputs for the transmitter may be connected at any one of three points in the sound processor system at the option of the user: 1) the preamp output/input; 2) the L/R/C processor output; or 3) the L/R/C on the processor card cage. Each option has its advantages. Preamp connection provides a simple connection to the L and R channels with full stereo audio present. However, switching between different audio signal formats (optical, magnetic and digital) is not possible. Also, audio at this point has not been noise reduced and has 10 dB amplitude compression. In contrast, the audio signal at the L/R/C channels of the processor card cage "Cat. No. 64" inputs has been noise reduced and does not have 10 dB amplitude compression. However, audio at this point is flat and the compensation for theater acoustics is not present.

It will be understood that the system described in the above preferred embodiment will have a number of different applications. In one application, a typical system setup might be in a movie theater with ten screens. In operation, a transmitter is typically placed near each screen projector and sound processor and connected to the sound processor. Assuming that all screens are next to each other, in a row, ten transmitters can be set to selected channels as shown in the example below:

| Screen | Transmitter channel | Movie showing |
|---|---|---|
| 1 | 1 | Summer Place |
| 2 | 5 | Years of Your Life |
| 3 | 9 | Sometime |
| 4 | 2 | Yesteryear |
| 5 | 6 | Gone With Same |
| 6 | 10 | Tomorrow |
| 7 | 3 | Outerspace |
| 8 | 7 | Things |
| 9 | 4 | Showtime |
| 10 | 8 | The House |

The label areas 14 on the programmer/charger could be marked as follows.

| | |
|---|---|
| SUMMER PLACE | GONE WITH SAM |
| YESTERYEAR | THINGS |
| OUTERSPACE | THE HOUSE |
| SHOWTIME | SOMETIME |
| YEARS OF YOUR LIFE | TOMORROW |

The programmer/charger could be located in the ticket booth. When a patron buys a ticket to see "Outerspace" and desires an ALD, the attendant would press the membrane style pad labeled "OUTERSPACE". This programs all receivers to channel 3 which will receive the transmitted audio signal for "OUTERSPACE". (However, the attendant may not know, and does not need to know, that channel 3 is assigned to that movie.) The attendant then can pick any receiver and hand it to the patron. If the next patron wants an ALD for another movie then the attendant simply presses the membrane style pad labeled for that movie and then picks any receiver and hands it to the patron. Furthermore, if a group of ten persons wants to see the same movie, the attendant need press only the appropriate pad and hand out any ten of the receivers.

Other uses for this system could include convention centers, schools, collages, churches, and stage productions. A programmer (with multiple pockets or a single receiver pocket) might be mounted inside the door entry to a room or on a nearby wall. One of the pads might be designated to correspond to the channel of the microphone transmitter used by the instructor. An ALD user would simply put a receiver into the pocket of the programmer charger upon entering the room, press the identified pad to program the receiver for that particular class and then remove it. Programming takes place in less than a second while the receiver is in the pocket. The procedure could be repeated as a user goes from room to room. This allows a college or school easily to provide ALD systems in which a hearing impaired person (or a person sitting in the rear of a large classroom) could easily hear one or several lectures throughout the day with only a single portable receiver which is returned to a central location at the end of the day. No attendant is required in the class rooms to program the receiver.

A fully switch programmable transmitter can be provided to the instructors. Like the forgoing receiver, it is preferably small and battery operated. A lapel microphone could be used so that the instructor may move about. Alternatively, a microphone could be connected to the MIC input connector of a transmitter of the type shown in FIG. 3. In yet another application, different channels could be used in the same room by different receivers so as to provide multi-lingual audio for the same presentation. The pads of the selection panel 10 of the programmer/charger could be labeled with different languages. One could then program an ALD for the language desired simply by pressing the pad designated for that language. Alternatively, a plurality of programmer/chargers could be provided each corresponding to one language. One wall programmer could be set to the channel for English and another one could be programmed to the channel for the second language. The ALD user could simply put the receiver into the appropriate programmer for the language wanted.

The invention is not limited to the system illustrated in the drawings and described above. Modifications and variations are possible within the inventive concept. The disclosure should not be construed as limiting the scope of the following claims, which specifically define the invention.

What is claimed is:

1. A programmable FM listening system, comprising:

an FM transmitter for transmitting an audio signal on a selected one of a plurality of predetermined channels;

at least one receiver to discriminate the audio signal transmitted on said selected channel and provide the audio signal to a listener; and an integrated programmer and charger including a plurality of keys defining a keypad, a single one of each of said plurality of keys corresponding on a one-to-one basis to a respective single one of said plurality of predetermined channels;

wherein said receiver is tuned to one of said plurality of predetermined channels when a corresponding one of said plurality of keys is actuated;

wherein said receiver is adapted to be tuneable only when electrically connected to said integrated programmer and charger and;

wherein said receiver is adapted to discriminate the channel tuned to when electrically connected to said integrated programmer and charger when said receiver is not electrically connected to said integrated programmer and charger.

2. The system of claim 1, wherein said at least one receiver further comprises a plurality of receivers and the plurality of receivers can be programmed simultaneously by said integrated programmer and charger.

3. The system of claim 1, wherein said at least one receiver further comprises a plurality of receivers and the plurality of receivers can be charged simultaneously by said integrated programmer and charger.

* * * * *